United States Patent

Baring

[15] 3,653,069
[45] Mar. 28, 1972

[54] MULTISTYLUS RECORDING HEAD

[72] Inventor: John A. Baring, Golden, Colo.

[73] Assignee: Honeywell, Inc., Minneapolis, Minn.

[22] Filed: Nov. 18, 1970

[21] Appl. No.: 90,565

[52] U.S. Cl. ........................... 346/139, 335/215, 335/229
[51] Int. Cl. ................................................... G01d 15/24
[58] Field of Search ............ 346/139 R, 141; 335/215, 229; 101/DIG. 5

[56] References Cited

UNITED STATES PATENTS

| | | | |
|---|---|---|---|
| 2,475,148 | 7/1949 | Massa | 335/215 X |
| 3,151,543 | 10/1964 | Preisinger | 101/93 |

Primary Examiner—Joseph W. Hartary
Attorney—Arthur H. Swanson, Lockwood D. Burton and Mitchell J. Halista

[57] ABSTRACT

A multistylus recording head having a plurality of recording styli with each stylus incorporating a multilayer magneto-strictive structure having two adjacent layers with opposing magnetostrictive properties for producing a bending of the stylus in the presence of a longitudinally applied magnetic field. One end of each of the styli is arranged along a recording line and adjacent to a magnetic boundary displacement structure to form a magnetic flux path therewith. The magnetic displacement structure is energized by an input signal to produce a selective displacement of a magnetic null in a composite magnetic field. The magnetic null is positioned with respect to the recording styli whereby a selected stylus is arranged to be in contact with a recording medium while the remaining styli are bent out of contact with the recording medium by effect of the remaining magnetic field.

2 Claims, 3 Drawing Figures

PATENTED MAR 28 1972 3,653,069

INVENTOR.
JOHN A. BARING
BY Mitchell J. Halista
ATTORNEY.

MULTISTYLUS RECORDING HEAD

BACKGROUND OF THE INVENTION

A visible recording of an analog signal representative waveshape on a recording medium by conventional recorders has required either the use of a mechanically driven recording element which is capable of sweeping across the recording medium on a recording line, the use of a multi-pin recording head extending across A recording medium and cooperating with a separate means for selectively energizing the individual recording elements of the recording head, or the use of radiant energy or electron beam recording techniques. These prior art types of analog recording mechanisms have inherent drawbacks which preclude the development of a simple and low cost recording system. The mechanical sweep recorder, e.g., pen and ink, is mechanically complex and has, inherently, a low recording speed. The multi-element head extending across the recording medium is usually used with a separate electronic or electro-mechanical means for commutating the input signal to the various recording elements which commutating means increases the cost of the overall recording system. The radiant energy or electron beam recorder, e.g., oscillograph or cathode ray tube recording means, involves the use of either sophisticated and complicated electronic circuitry or electro-mechanical components as well as a special recording medium capable of translating the energy of the recording beam to produce a visible trace.

Accordingly, it is an object of the present invention to provide a novel multistylus recording head for recording a waveshape representative of an input signal.

Another object of the present invention is to provide a novel multistylus recording head having integral means for commutating an input signal to the recording styli.

A further object of the present invention is to provide A novel multisytlus recording head capable of being used with various recording techniques while providing a high speed recording structure.

SUMMARY OF THE INVENTION

In accomplishing these and other objects, there has been provided, in accordance with the present invention, a multistylus recording head having a plurality of recording styli. Each recording stylus incorporates a multilayer magnetostrictive structure with at least two of the layers of the stylus having opposing magnetostrictive properties to produce a bending of the stylus in the presence of a magnetic field. The styli are arranged along a recording line adjacent to a magnetic boundary-displacement recording structure energized by an input signal to produce a selective displacement of a magnetic null in a composite magnetic field to produce an actuation of a desired stylus into a recording position at the magnetic null point of the recording structure.

DETAILED DESCRIPTION

Figure 1:
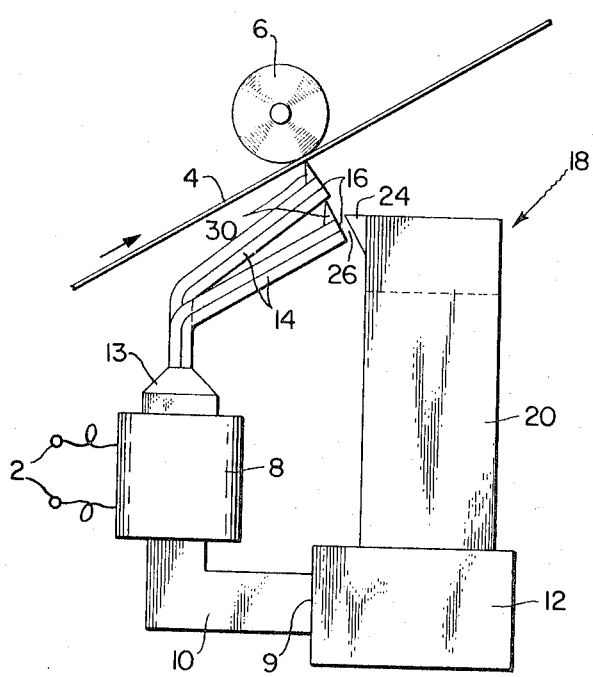
FIG. 1 is a pictorial representation of a side view of a multistylus recording head embodying the present invention.
Figure 2:
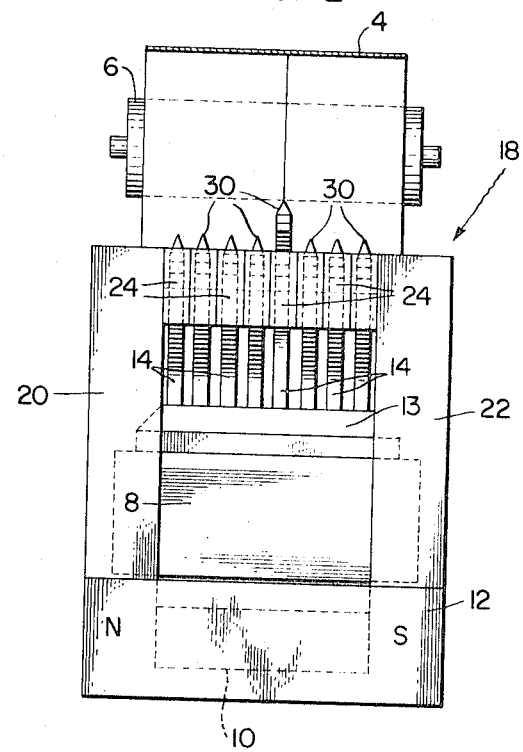
FIG. 2 is an end view of the multistylus recording head shown in FIG. 1.
Figure 3:
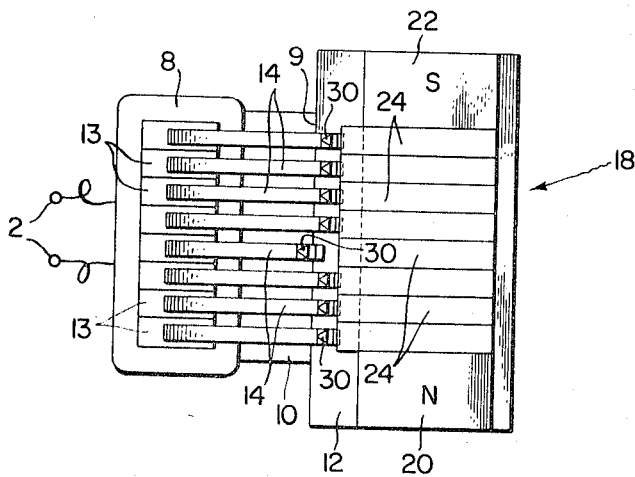
FIG. 3 is a top view of the multistylus recording head shown in FIG. 1.

Referring to FIG. 1 in more detail, there is shown a multistylus recording head arranged to record a visible waveshape representation of an input signal applied to a pair of input terminals 2. A recording medium 4 is driven by a suitable transport means (not shown) over a roller 6 located adjacent to the recording area of the multistylus recording head of the present invention. The input terminals 2 are connected to a magnetic field producing solenoid 8 which is wound on a core structure 10 having a rectangular cross section. A first a 9 of the core structure 10 is attached to a predetermined flux producing base member 12, i.e., a permanent magnet. Specifically, the rectangular face of the first end 9 is attached to a side of the magnet base 12 between the magnetic poles thereof with the long dimension of the first end 9 extending between the magnetic poles. The other, or second, end 13 of the magnetic core structure 10 is arranged to support one end of each of a plurality of similar multilayer magnetostrictive recording styli 14. A suitable multilayer structure for the magnetostrictive styli 14 may be found in an article by J. R. Kench entitled "Temperature Insensitive Magnetostrictive Composite" in the October 1969 issue of "The Review of Scientific Instruments," Vol. 40, No. 10, on pages 1295 to 1299. Additionally, the bending of a multilayer magnetostrictive structure when subjected to a longitudinal magnetic field is discussed in this article and is well-known in the art.

A free end 16 of each of the recording styli 14 is positioned adjacent to a magnetic field producing structure 18 supported on a side of the permanent magnet base 12 adjacent to the side attached to the core structure 10. The free ends 16 of the recording styli also define a transverse recording line on the medium 4. The magnetic field producing structure 18 includes a pair of parallel support legs 20 and 22 extending perpendicularly from respective magnetic pole ends of the permanent magnet base 12 and a defining gap across the free ends thereof substantially equal to the dimension of the transverse recording line of the recording head structure. Within this gap are positioned a plurality of stacked laminations 24 of magnetically permeable material with the thickness of each of the laminations 24 being approximately either equal to or slightly greater than the width of a recording stylus 14.

The free end of each of the styli 14 and a corresponding one of the laminations 24 are arranged to define a magnetic gap 26. The side of each of the laminations 24 adjacent to the gap 26 may have a characterized extension 28 to further define the gap 26 as a means for concentrating the magnetic flux therein. The free end of each of the styli 14 may have a recording point 30 thereon and directed toward the recording medium 4 to improve the contact of a selected stylus with the recording medium 4.

In operation, the multistylus recording head of the present invention is energized by an input signal applied thereto to select one of the recording styli 14 for producing a recording on the recording medium 4. This operation is controlled by a longitudinal magnetic field applied to the styli 14 across the gap 26, by a combination of the magnetic field from the permanent magnet base 12 and from the input signal responsive solenoid 8. Utilizing the so-called well-known boundary-displacement of a magnetic field across the stacked laminations 24, the magnetic field gradiant in the gap 26 has a null point which can be selectively located at one of the laminations 24. A more complete discussion of this technique is found in the article entitled "Bountary-Displacement Magnetic Recording" by H. L. Daniels in the April, 1952 issue of "Electronics" on Pages 116-120. Briefly, the permanent magnet base 12 produces a bias field across the stacked laminations 24 derived from the transverse magneto-motive force drop thereof. This zero-input-signal situation produces a magnetic field across the lamination gap which varies in magnetic potential linearly from a positive value at one end of the lamination stack 24 to an equal negative value at the other end with zero magnetic potential, i.e., a null, being located at the midpoint of the lamination stack.

In the presence of an input signal applied to the solenoid 8, a magnetic field component which is proportional to the instantaneous input signal amplitude is produced by the solenoid 8 and is superimposed upon this bias field to displace the aforesaid zero field point in a direction away from the midpoint of the lamination stack dependent on the polarity of the input signal. This null displacement is proportional to the input signal amplitude so long as the magnetic field component produced by the input signal does not exceed the static bias field.

A stylus is selected for recording from the plurality of styli 14 by the position of the aforesaid null in the magnetic field across the gap 26. Specifically, the styli 14 which are subjected to a longitudinal magnetic field are arranged, by a proper ordering of their magnetostrictive layers, to bend toward the lamination stack 24. This bending is produced by the combined effect of the magnetostrictive properties of the multilayer stylus structure. The bending of the unselected styli displaces their recording points 30 away from the recording medium 4. Concurrently, the selected stylus located at the magnetic null is allowed to remain in normal elevated position with its recording point 30 in contact with the recording medium 4. Thus, as the position of the magnetic null is varied from side to side of the lamination stack by the combined effect of the input signal field and the permanent magnet field, the styli 14 are selectively actuated to rise at the null location with a selected stylus having its recording point 30 in contact with the recording medium 4 for performing the recording function.

The strength of the permanent magnet 12 for any given recording head structure will be determined by the slope of a plot of flux density versus position along the stack. The steeper slopes provide adequate selectivity to insure the selection of one recording stylus at a time. On the other hand, steeper slopes require larger drive currents per unit of deflection. In a typical null displacement head, the cross sectional area of the permanent magnet 12 is selected to provide the required slopes in the gap and yield the most efficient magnetic circuit. A typical operating point would be 10,000 gauss and 550 oersteds. Typical magnetic field intensities in the gap 26 vary from 200 to 1,000 oersteds per centimeter from null. In order to provide a suitable record of a rapidly varying input signal a minimum of 50 styli per inch would be suitable for an average recording structure with a preferred value of over 100 styli per inch. The material used for the core structure 10 is preferably of a magnetically homogenious structure while the stacked laminations 24 being of a magnetically permeable material are arranged to exhibit across the stack a transverse magnetic reluctance high enough to absorb a major part of the magnetomotive force produced by the bias magnet 12. The type of recording operation produced by the recording point 30 may, of course, be of any suitable type including pressure on a pressure sensitive medium, electrostatic recording on an electrostatically sensitive medium, spark recording on a suitable medium, etc.

Accordingly, it may be seen that there has been provided in accordance with the present invention a multistylus recording head structure utilizing integral means for commutating an input signal to the recording styli for recording a waveshape representation of an input signal.

The embodiments of the invention in which an exclusive property or privilege is claimed are defined as follows:

1. A multistylus recording head comprising a plurality of multilayer magnetostrictive recording styli with each of said styli having at least two layers having opposing magnetostrictive properties to produce a bending of the stylus in the presence of a magnetic field, and a magnetic field producing structure arranged to selectively orient a magnetic null with respect to one of said styli while subjecting the remaining ones of said styli to a magnetic field to produce a bending thereof whereby said one of said styli located at said magnetic null is physically separated from the rest of said styli.

2. A multistylus recording head as set forth in claim 1 wherein said magnetic field producing structure includes a solenoid arranged to be energized by an input signal to produce a magnetic field component, and a magnetic bias field structure including a source of a fixed magnetomotive force and a magnetoresistive means for absorbing said magnetomotive force whereby to produce across said magnetoresistive structure a magnetic potential gradiant having a null located along said magnetoresistive structure, said magnetic field component from said solenoid being arranged to interact with said magnetoresistive structure to displace said magnetic null in proportion to the amplitude of an energizing signal applied to said solenoid.

* * * * *